(12) United States Patent
Thirunavukkarasu

(10) Patent No.: US 11,282,093 B2
(45) Date of Patent: Mar. 22, 2022

(54) METHOD AND SYSTEM FOR MACHINE LEARNING BASED ITEM MATCHING BY CONSIDERING USER MINDSET

(71) Applicant: Tata Consultancy Services Limited, Mumbai (IN)

(72) Inventor: Jeisobers Thirunavukkarasu, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 192 days.

(21) Appl. No.: 16/707,748

(22) Filed: Dec. 9, 2019

(65) Prior Publication Data
US 2020/0211036 A1  Jul. 2, 2020

(30) Foreign Application Priority Data
Dec. 31, 2018  (IN) .............................. 201821049990

(51) Int. Cl.
G06Q 10/00 (2012.01)
G06Q 30/02 (2012.01)
(Continued)

(52) U.S. Cl.
CPC ......... G06Q 30/0201 (2013.01); G06N 5/003 (2013.01); G06N 7/005 (2013.01);
(Continued)

(58) Field of Classification Search
None
See application file for complete search history.

(56) References Cited

U.S. PATENT DOCUMENTS 6,751,600 B1  6/2004  Wolin
2008/0294583 A1  11/2008  Hunt et al.
(Continued)

OTHER PUBLICATIONS

Rau, Pei-Luen Patrick, Cross-Cultural Design, 2017, Springer, https://link.springer.com/content/pdf/10.1007%2F978-3-319-57931-3.pdf, p. 1-758. (Year: 2017).*
(Continued)

*Primary Examiner* — Joseph M Waesco
(74) *Attorney, Agent, or Firm* — Finnegan, Henderson, Farabow, Garrett & Dunner LLP

(57) ABSTRACT

Existing approaches for item matching that are used for retail strategies are based on similarity matching, however, do not consider user mindset, magnitude present across quantitative AVs and segment specific customer interest on certain qualitative AVs. Embodiments of the present disclosure provide a method and system for Machine Learning (ML) based item matching by considering user mindset, magnitude present across quantitative AVs and segment specific customer interest on certain qualitative AV. The item matching approach disclosed, performs data analytics at the AV level to identify possible close matching items from the list of available partially matching as well as non-matching items. The method disclosed primarily performs Attribute (AT) enrichment by quantizing all the qualitative AVs to be analyzed. Weights are assigned to all the quantized AVs based on a Demand Transfer (DT) value provided by a Customer Decision Tree (CDT), wherein the CDT captures the user mindset.

7 Claims, 6 Drawing Sheets

(51) Int. Cl.
*G06N 20/00* (2019.01)
*G06N 7/00* (2006.01)
*G06N 5/00* (2006.01)

(52) U.S. Cl.
CPC ......... *G06N 20/00* (2019.01); *G06Q 30/0206* (2013.01); *G06Q 30/0282* (2013.01)

(56) References Cited

U.S. PATENT DOCUMENTS

| | | | | |
|---|---|---|---|---|
| 2010/0153187 A1* | 6/2010 | Ghani | ................ | G06Q 30/0204 705/14.53 |
| 2011/0173093 A1* | 7/2011 | Psota | .................... | G06Q 30/06 705/26.35 |
| 2013/0268403 A1* | 10/2013 | Psota | ................ | G06Q 30/0609 705/26.35 |
| 2013/0317954 A1* | 11/2013 | Psota | .................... | G06Q 40/02 705/30 |
| 2014/0136549 A1 | 5/2014 | Surya et al. | | |
| 2014/0258032 A1* | 9/2014 | Psota | ................ | G06Q 30/0609 705/26.35 |
| 2014/0278755 A1* | 9/2014 | Eberl | ................ | G06F 16/24556 705/7.29 |
| 2014/0280190 A1* | 9/2014 | Cronin | ................ | G06F 3/04842 707/741 |
| 2015/0073929 A1* | 3/2015 | Psota | ................ | G06Q 30/0605 705/26.2 |
| 2015/0127419 A1 | 5/2015 | Tiwari et al. | | |
| 2016/0300144 A1* | 10/2016 | Santhanam | ............ | G06N 20/00 |
| 2017/0235848 A1* | 8/2017 | Van Dusen | ........... | G06F 16/904 705/12 |
| 2017/0323358 A1* | 11/2017 | Psota | .................. | G06Q 10/083 |
| 2019/0370690 A1* | 12/2019 | Anderson | ............. | G06N 20/10 |

OTHER PUBLICATIONS

Ristoski, P. et al. (Oct. 2016). "A Machine Learning Approach for Product Matching and Categorization," retrieved from https://www.semanticscholar.org/paper/A-machine-learning-approach-for-product-matching-Ristoski-Petrovski/1f35488b9d37339864d118bc1de827d624541813 (17 pages).

* cited by examiner

| C1 | C2 | C3 | C4 | C5 | C6 | C7 | C8 | C9 | C10 | C11 | C12 | C13 |
|---|---|---|---|---|---|---|---|---|---|---|---|---|
| Date | Store ID | Product Id | Demographic 1 | Demographic 2 | ... | Demographic n | No. of competitors | Average comp distance | Product under promotion (Y/N) | Number of promotions within category | Retailer Price | Comp_1 Price |
| 2018/01/01... | Store 1 | Prod 1 | | | | | | | | | | |
| 2018/01/01... | Store 1 | Prod 2 | | | | | | | | | | |
| 2018/01/01... | Store 1 | Prod 3 | | | | | | | | | | |
| 2018/01/02... | | | | | | | | | | | | |
| 2018/01/03... | | | | | | | | | | | | |
| 2018/12/01... | | | | | | | | | | | | |
| 2018/12/02... | | | | | | | | | | | | |
| 2018/12/03... | | | | | | | | | | | | |

FIG. 3A

| C14 | C15 | C16 | C17 | C18 | C19 | C20 | C21 | C22 | C23 | C24 | C25 |
|---|---|---|---|---|---|---|---|---|---|---|---|
| Comp_2 _Price | Comp_3 _Price | Comp_4 _Price | Comp_5 _Price | Attribu te_1 | Attribu te_2 | Attribu te_3 | Attribu te_4 | Attribu te_5 | Attribu te_6 | Attribu te_7 | Share |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

FIG. 3B

| Date/Time | Product ID | Retailer Price | Comp 1 Price | Comp 2 Price | Comp 3 Price | Comp 4 Price | Comp 5 Price | Attribute 1 | Attribute 2 | Attribute 3 | Attribute 4 | Attribute 5 | Attribute 6 | Attribute 7 |
|---|---|---|---|---|---|---|---|---|---|---|---|---|---|---|
| 2018/01/01...10:00 | | | | | | | | | | | | | | |
| 2018/01/01...11:00 | | | | | | | | | | | | | | |
| 2018/01/01...12:00 | | | | | | | | | | | | | | |
| 2018/01/01...13:00 | | | | | | | | | | | | | | |
| 2018/01/01...14:00 | | | | | | | | | | | | | | |
| 2018/01/01...15:00 | | | | | | | | | | | | | | |
| 2018/12/01...10:00 | | | | | | | | | | | | | | |
| 2018/12/01...11:00 | | | | | | | | | | | | | | |
| 2018/12/01...12:00 | | | | | | | | | | | | | | |
| 2018/12/01...13:00 | | | | | | | | | | | | | | |

FIG. 4

METHOD AND SYSTEM FOR MACHINE LEARNING BASED ITEM MATCHING BY CONSIDERING USER MINDSET

PRIORITY CLAIM

The present application claims priority from Indian patent application no. 201821049990, filed on Dec. 31, 2018. The entire contents of the aforementioned application are incorporated herein by reference.

TECHNICAL FIELD

The disclosure herein generally relates to data analytics, and, more particularly, to method and system for data analytics for item matching.

BACKGROUND

Item matching plays a significant role for retailers as well as consumers in retail industry. An entity, such as a retailer, utilizes item matching or product matching approach to identify similar products sold by one or more major competitors. In addition retailer can get aggregated product ratings and price trends from across the web. The retailer can enrich existing product catalog with aggregated product data from different stores. Retailers can identify assortment gaps by comparing their assortment with that of their competitors. From consumer point of view, they can quickly compare product prices across stores and go for the best deal on offer.

Item matching is the process by which two products are compared based on their attributes. Usually products or items are matched within product categories. For example, categories may include, but are not limited to toothpaste, coffee, ice cream, and yogurt. The number of Attributes (ATs), such as brand, color, ingredients, that differentiate products or items within a category, vary based on the category. Each AT can further have multiple Attribute Values (AVs). When the number of categories is lesser, chances or probability of finding matching items is high and probability decreases as the number of attributes increase. The reason being, increase in the number of combination of ATs and AVs create unique combination of a product. Practically, in light of such scenarios, rather than exact match a close match is more searched for. However, current method focus mostly on exact matching techniques. Partial mapping is a challenge as not all AVs are qualitative for determining relevancy or performing direct comparison. For example, for AT color, the AVs may be black, white and pink, which are qualitative. However, for AT such as memory, AVs such as 2 GB, 4 GB and 6 GB are quantitative. Also, customer mindset or user mindset plays a major role in identifying relevancy when items to be matched have partially similar AVs, wherein in there always exists effect of on AV on other.

SUMMARY

Embodiments of the present disclosure present technological improvements as solutions to one or more of the above-mentioned technical problems recognized by the inventors in conventional systems.

For example, in one aspect, there is provided a hardware processor implemented method for item matching. The method comprising selecting an item of interest among a plurality of items associated with an entity for identifying a matching item set comprising partial matching items and non-matching items from one of the plurality of items of the entity and a plurality of competitor items of a competitor entity among a plurality of competitor entities having a category identical to the category of the item, wherein each item from the plurality of items and the plurality of competitor items is defined by a set of Attribute Value (AVs), wherein each AV among the set of AVs correspond to one of a qualitative AV type and a quantitative AV type. Further, the method comprises performing AT enrichment for quantizing a plurality of AVs corresponding to the qualitative AV type based on a Machine Learning (ML) technique. The AT enrichment comprises at least one of: determining AV level performance, depicting estimate of sales share per day, for the plurality of AVs of the plurality of items corresponding to the qualitative AV type, if the matching item set is to be identified from the plurality of items of the entity; and determining AV level estimate of price variation per time frame, for the plurality of AVs of the plurality of competitor items corresponding to the qualitative AV type, if the matching item set is to be identified from the plurality of competitor items of the competitor entity. Further, the method comprises standardizing, by the processor, values of the AV level performance of the plurality of AVs of the qualitative AV type of the plurality of items and the AV level estimate of price variation s of the plurality of competitor items, associated with the category of the item; and the plurality of AVs of the quantitative type, corresponding to the plurality of items and plurality of competitor items, associated with the category of the item. Further, the method comprises assigning weights, by the processor, to the standardized values, wherein weight is based on Demand Transfer (DT) value provided by a Customer Decision Tree (CDT) obtained for the category of the item, wherein the DT value captures user mindset. Furthermore, the method comprises identifying matching item set based on a matching score computed by comparing the weighted standardized values of the plurality of AVs of the item with one of the weighted standardized values of the plurality of AVs of the of the plurality of items, if the matching item set is to be identified from the plurality of items of the entity, wherein the matching item set, arranged in descending order of the matching score, comprises the partial matching items and the non-matching items from the plurality of items of the entity being compared; and the weighted standardized values of the plurality of AVs of the of the plurality of competitor items, if the matching item set is to be identified from the plurality of competitor items of the competitor entity, wherein the matching item set, arranged in descending order of the matching score, comprises the partial matching items and the non-matching items from the plurality of competitor items of the competitor entity being compared.

In another aspect, there is provided a system for item matching. The system comprising: a memory storing instructions; one or more Input/Output (I/O) interfaces; and one or more processors coupled to the memory via the one or more I/O interfaces, wherein the one or more processors are configured by the instructions to select an item of interest among a plurality of items associated with an entity for identifying a matching item set comprising partial matching items and non-matching items from one of the plurality of items of the entity and a plurality of competitor items of a competitor entity among a plurality of competitor entities having a category identical to the category of the item, wherein each item from the plurality of items and the plurality of competitor items is defined by a set of Attribute Value (AVs), wherein each AV among the set of AVs correspond to one of a qualitative AV type and a quantitative AV type. Further, the one or more processors are configured to perform AT enrichment for quantizing a plurality of AVs corresponding to the qualitative AV type based on a Machine Learning (ML) technique. The AT enrichment comprises at least one of: determining AV level performance, depicting estimate of sales share per day, for the plurality of AVs of the plurality of items corresponding to the qualitative AV type, if the matching item set is to be identified from the plurality of items of the entity; and determining AV level estimate of price variation per time frame, for the plurality of AVs of the plurality of competitor items corresponding to the qualitative AV type, if the matching item set is to be identified from the plurality of competitor items of the competitor entity. Further, the one or more processors are configured to standardize values of the AV level performance of the plurality of AVs of the qualitative AV type of the plurality of items and the AV level estimate of price variation of the plurality of competitor items, associated with the category of the item; and the plurality of AVs of the quantitative type, corresponding to the plurality of items and plurality of competitor items, associated with the category of the item. Further, the one or more hardware processors are configured to assign weights to the standardized values, wherein weight is based on Demand Transfer (DT) value provided by a Customer Decision Tree (CDT) obtained for the category of the item, wherein the DT value captures user mindset. Furthermore, the one or more processors are configured to identifying matching item set based on a matching score computed by comparing the weighted standardized values of the plurality of AVs of the item with one of the weighted standardized values of the plurality of AVs of the of the plurality of items, if the matching item set is to be identified from the plurality of items of the entity, wherein the matching item set, arranged in descending order of the matching score, comprises the partial matching items and the non-matching items from the plurality of items of the entity being compared; and the weighted standardized values of the plurality of AVs of the of the plurality of competitor items, if the matching item set is to be identified from the plurality of competitor items of the competitor entity, wherein the matching item set, arranged in descending order of the matching score, comprises the partial matching items and the non-matching items from the plurality of competitor items of the competitor entity being compared.

In yet another aspect, there are provided one or more non-transitory machine readable information storage mediums comprising one or more instructions which when executed by one or more hardware processors causes a method for item matching. The method comprising selecting an item of interest among a plurality of items associated with an entity for identifying a matching item set comprising partial matching items and non-matching items from one of the plurality of items of the entity and a plurality of competitor items of a competitor entity among a plurality of competitor entities having a category identical to the category of the item, wherein each item from the plurality of items and the plurality of competitor items is defined by a set of Attribute Value (AVs), wherein each AV among the set of AVs correspond to one of a qualitative AV type and a quantitative AV type. Further, the method comprises performing AT enrichment for quantizing a plurality of AVs corresponding to the qualitative AV type based on a Machine Learning (ML) technique. The AT enrichment comprises at least one of: determining AV level performance, depicting estimate of sales share per day, for the plurality of AVs of the plurality of items corresponding to the qualitative AV type, if the matching item set is to be identified from the plurality of items of the entity; and determining AV level estimate of price variation per time frame, for the plurality of AVs of the plurality of competitor items corresponding to the qualitative AV type, if the matching item set is to be identified from the plurality of competitor items of the competitor entity. Further, the method comprises standardizing, by the processor, values of the AV level performance of the plurality of AVs of the qualitative AV type of the plurality of items and the AV level estimate of price variation s of the plurality of competitor items, associated with the category of the item; and the plurality of AVs of the quantitative type, corresponding to the plurality of items and plurality of competitor items, associated with the category of the item. Further, the method comprises assigning weights, by the processor, to the standardized values, wherein weight is based on Demand Transfer (DT) value provided by a Customer Decision Tree (CDT) obtained for the category of the item, wherein the DT value captures user mindset. Furthermore, the method comprises identifying matching item set based on a matching score computed by comparing the weighted standardized values of the plurality of AVs of the item with one of the weighted standardized values of the plurality of AVs of the of the plurality of items, if the matching item set is to be identified from the plurality of items of the entity, wherein the matching item set, arranged in descending order of the matching score, comprises the partial matching items and the non-matching items from the plurality of items of the entity being compared; and the weighted standardized values of the plurality of AVs of the of the plurality of competitor items, if the matching item set is to be identified from the plurality of competitor items of the competitor entity, wherein the matching item set, arranged in descending order of the matching score, comprises the partial matching items and the non-matching items from the plurality of competitor items of the competitor entity being compared.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a component of this disclosure, illustrate exemplary embodiments and, together with the description, serve to explain the disclosed principles:

FIG. 3A and FIG. 3B illustrates an example first training data set for a first Machine Learning (ML) model of the system of FIG. 1, in accordance with an embodiment of the present disclosure.

FIG. 4 depicts an example second training data set for a second ML model of the system of FIG. 1, in accordance with an embodiment of the present disclosure.

DETAILED DESCRIPTION OF EMBODIMENTS

Figure 1:
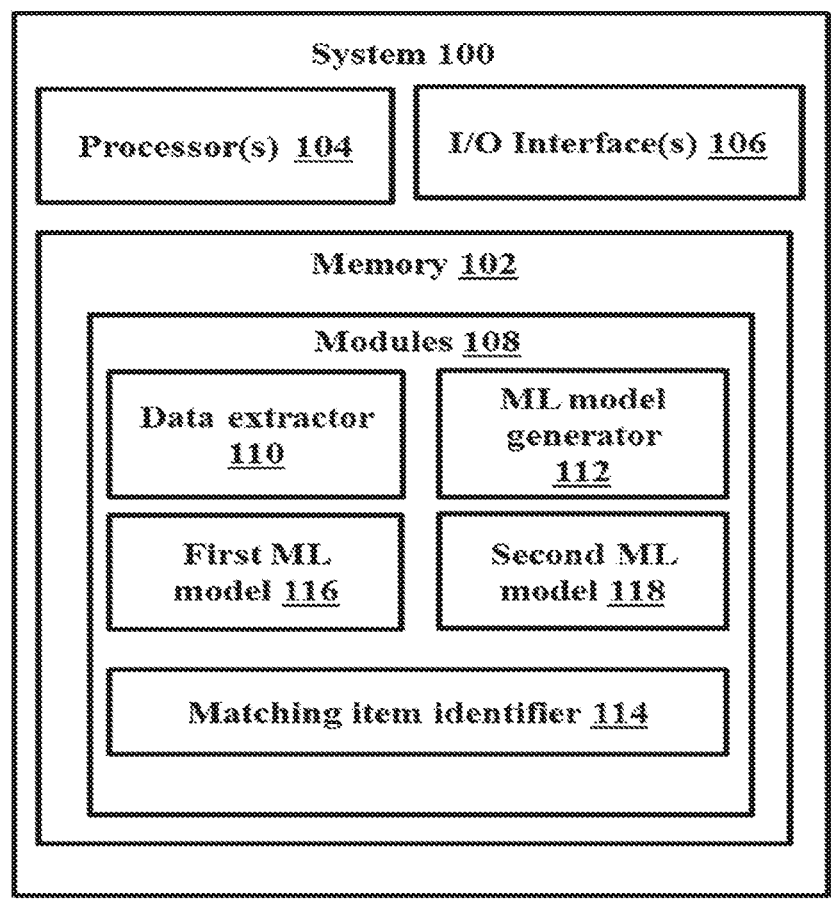
FIG. 1 illustrates an exemplary block diagram of a system for performing Machine Learning (ML) based item matching by considering user mindset, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide a method and system for Machine Learning (ML) based item matching by considering user mindset. The item matching approach disclosed, performs data analytics at Attribute Value (AV) level. Many known techniques exist that focus on providing item matching to identify exact match between an item and other items available. However, considering possibility of multiple AVs associated with category of an item, chances of exact matches are low. Further, in a competitive market such as a retail market, it is equally important and critical to focus of possible close matches of an item of interest, even though they may not be exact matches. The reason can be explained with an example. In an retail scenario a possible close matching item can be a strong alternative candidate for the item of interest and a customer may change his/her buying decision based on available close match, even though an exact match may or may not be available. The closeness, herein, is governed by many factors, all considered by the customer or buyer at a time. Multiple AVs associated with the item play a significant role among various factors that may affect the user mindset. Exact matching happens when all the AVs of the item, alternatively referred as product, are identical to another item. When the number of available ATs and AVs are less, chances of finding an exact match are more as possible combinations are less. Thus finding the exact match is easier and combinations to be searched through are less. Partial matching happens when some and not all of the ATs and AVs of a product are identical to another product. When the number of attributes are high it is more common to get partial matching. No matching happens when none of the ATs and AVs are identical to another product.

Unlike existing approaches focusing on exact matching or deal with item similarity with models that do not accommodate customer angle or perspective, embodiments herein consider the user mindset and all AVs of items simultaneously to identify possible close matching items from available partially matching as well as non-matching items. The matched items are then ranked based on the closeness factor captured in terms of a matching score. To perform data analytics in AVs, the method disclosed primarily performs Attribute (AT) enrichment by quantizing all the qualitative AVs to be analyzed. Further, the weights are assigned to all the quantized AVs based on a Demand Transfer (DT) value provided by a Customer Decision Tree (CDT), wherein the CDT captures the user mindset.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 illustrates an exemplary block diagram of a system 100 for performing ML based item matching by considering user mindset, in accordance with an embodiment of the present disclosure.

In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. The I/O interface 106, through the ports is configured to receive data from entity database and data, corresponding to a plurality of competitor entities, which is crawled from a plurality of data sources such as a plurality of websites of a plurality of competitor entities to extract data associated with a plurality of competitor items.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a plurality of modules 108 can be stored in the memory 102, wherein the modules 108 may comprise a data extractor 110, a ML model generator 112 and matching item identifier 114. The modules 108 including the data extractor 110, the ML model generator 112 and the matching item identifier 114, when executed by the processors (s) 104 are configured perform item matching with data analytics at the AV level. The ML model generator is configured to generate and train a first ML model 116 and a second ML model 118. The functions of the modules 108 are explained in conjunction with a method 200 of FIGS. 2A and 2B. The memory 102 may further comprise information pertaining to input(s)/output(s) of each step performed by the modules 108 of the system 100 and methods of the present disclosure. The system 100, through the I/O interface 106 may be coupled to external plurality of data sources such as the entity database and the competitor websites and the like, providing data to be processed and analyzed by the system 100.

Figure 2A:
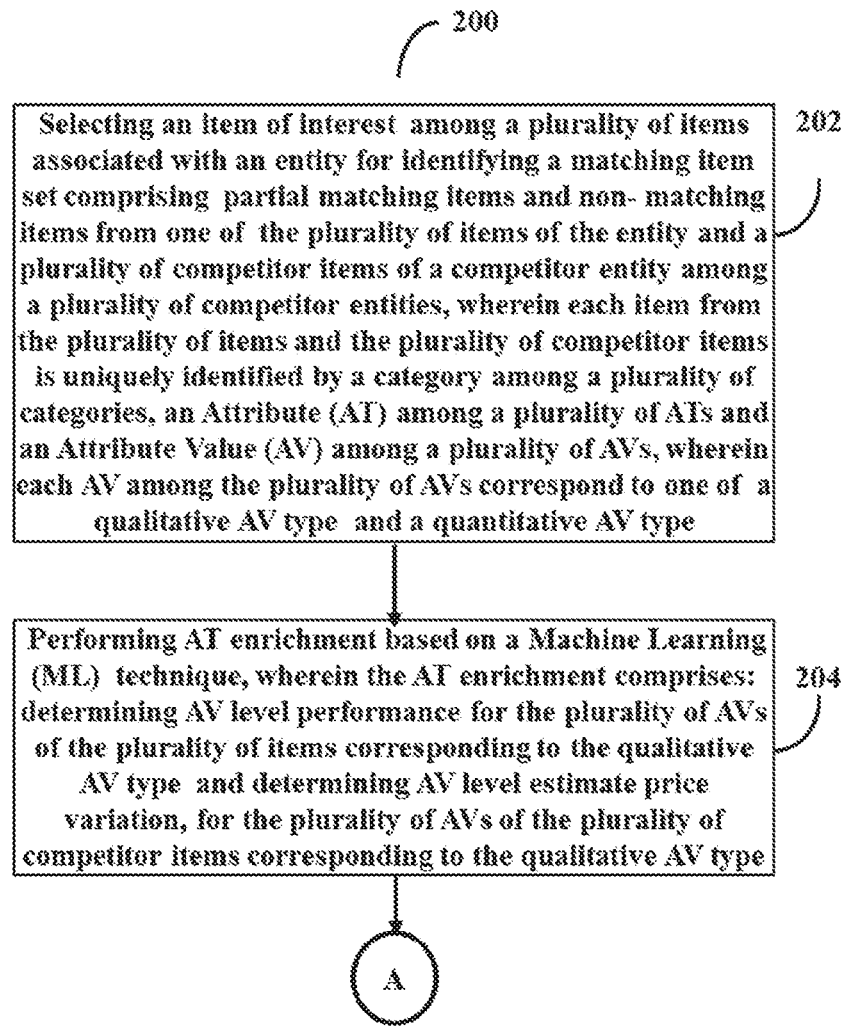
FIG. 2A and FIG. 2B illustrate an exemplary flow diagram of a method for performing ML based item matching by considering the user mindset, using the system of FIG. 1, in accordance with an embodiment of the present disclosure.
Figure 2B:
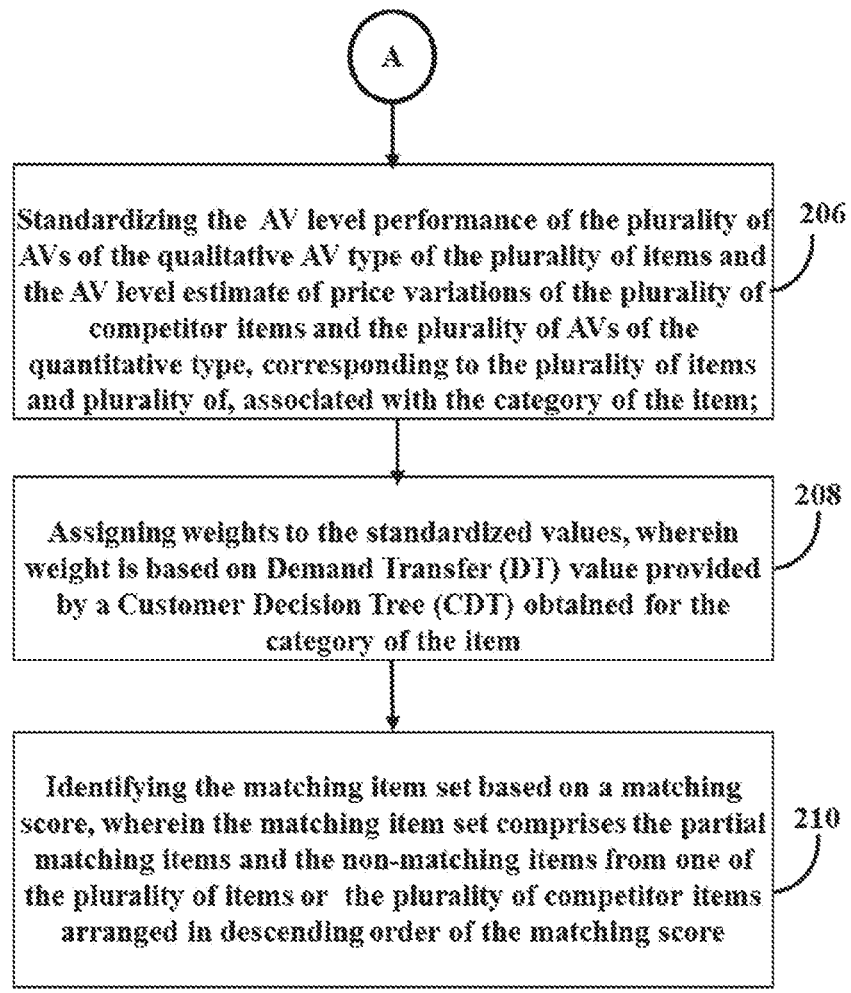

FIG. 2A and FIG. 2B illustrate an exemplary flow diagram of the method 200, performing ML based item matching by considering user mindset, in accordance with an embodiment of the present disclosure. In an embodiment, the system 100 comprises one or more data storage devices or the memory 102 operatively coupled to the one or more processors 104 and is configured to store instructions for execution of steps of the method 200 by the one or more processors (alternatively referred as processor(s)) 104 in conjunction with various modules of the modules 108. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

At step 202 of the method 200, the data extractor 110 when executed by the processors (s) 104 is configured to select an item of interest among the plurality of items associated with the entity. For the selected item, a matching item set is to be identified. The matching item set can comprises partial matching items and non-matching items from the plurality of items of the entity, when comparison is intended within the entity itself. However, if the comparison is intended with a competitor entity among the plurality of competitor entities, then the matching item set comprises a plurality of competitor items of the competitor entity, which are similar to the item. Thus, the method disclosed can provide two separate matching sets, wherein one matching set is a set of matching items associated with the entity that are similar to the item of interest. The other matching set is a set of matching items associated with the competitor entity, which are similar to the item of interest. An example category can be mobile, tooth paste, refrigerators and so on. However, throughout the description the method 200 is explained in conjunction with example from mobile category and may not be construed as limitation.

In an embodiment, the item of interest can be selected automatically by the data extractor 110. In an embodiment, the item can be selected based on the inputs received from an end user of the system 100, for example the entity or, a market analyst. The entity referred herein, for example can be a major retailer, while the competitor entity can be a major competitor of the major retailer. Further, each item among the plurality of items and the plurality of competitor items belonging to the category, say mobile will be identified uniquely by a plurality of Attributes (ATs) and a plurality of Attribute Values (AVs) for each AT. For example, the item, with category mobile, may be identified with multiple ATs such as brand, memory size and color. Further, each AT can have multiple values, referred as the AVs. For example, the brand can have AVs as brand X, brand Y and brand Z. The memory size can have AVs such as 2 GB, 4 GB and 16 GB. The color can have AVs such as white, pink and black. Thus each item is defined by a set of AVs, for example for category mobile herein it can be (brand value, memory size, color value) such as item1=(X, 4 GB, white), item2=(X, 2 GB, pink), item3=(Y, 16 GB, black). Thus it can be seen that the AVs associated with a category of item can have both a qualitative AV type, such as color white, brand X and/or a quantitative AV such as memory size of 4 GB.

Multiple techniques known in the art can provide exact matching items. The method 200 disclosed herein, specifically provides matching item set by analyzing items having partially matching and non-matching AVs within the category of the item.

Thus, once the item of interest is selected, based on whether the comparison is desired within entity or with the competitor entity the matching set provides the plurality of items of the entity arranged in descending order of a matching score or the plurality of competitor items of the competitor entity arranged in descending order of the matching score.

At step 204 of the method 200, the data extractor 110 is configured to perform AT enrichment for quantizing the plurality of AVs that belong to qualitative AV type, wherein the quantization is based on ML technique. The AT enrichment is applied to only the qualitative AVs of both, the plurality of items of entity and the plurality of items of the competitor entity such as pink, white, black color, X, Y, Z brand, while the quantitative AVs such as memory size 2 GB, 4 GB, 16 GB already have a quantitative value.

For the AT enrichment for the plurality of AVs belonging to the qualitative AV type associated with the plurality of items of the entity, the AT enrichment process for quantization of the qualitative AVs comprises determining AV level performance, depicting sales share per day, for the plurality of AVs. This AT enrichment herein, is in terms of estimate of sales share per day, as the estimate of sales share per day value is a reflection of importance given by a customer or user to the respective AV. Further, this estimate of sales share per day information for the AV of interest can be easily extracted from an entity database and can be used during training of the ML techniques.

However, for the AT enrichment for the plurality of AVs belonging to the qualitative AV type associated with the plurality of competitor items, extracting information about sales per day is practically not possible as it is confidential data of any competitor entity, not accessible through publicly available sources such as websites of the competitor entity. Thus, the AT enrichment process for quantization of the qualitative AVs of the competitor items comprises determining AV level estimate of price variation, for the plurality of AVs of the plurality of competitor items corresponding to the qualitative type.

ML is applied to enrich qualitative AVs with additional information such as performance or estimate of price variation. ML techniques help to consider different kind of relationship such as linear or nonlinear that occur across different sales drivers while estimating performance at AV level. Similarly, ML helps to consider different kind of relationship that exist across different competitor prices while estimating major retailer price variation at AV level. The ML technique comprises training the first ML 116 model 1 to determine the AV level performance values using the ML model generator 112. The first ML model 116 is generated and trained using known ML techniques such as Support Vector Machine (SVM), Random Forest and the like. The first ML model 116 is provided a first training data set extracted from an entity database. The first training data set is a two dimensional data matrix constructed for each category among the plurality of categories managed by the entity. A plurality of columns of the data matrix provide information to the first ML model 116 corresponding to a plurality of sales drivers recorded for the entity and a plurality of rows of the data matrix provide information to the first ML model 116 corresponding to a day for which corresponding sales drivers are recorded. The information is often maintained in the entity database. In an embodiment, the memory 102 can include the entity database. In an embodiment, the entity database can be external to the system 100 and accessed through the ports of the I/O interface 106.

An example of the first training data set is depicted in table of FIG. 3A and FIG. 3B. The first training data set is generated for each segment among a plurality of segments of every segment type among a plurality of segment types defined by the entity.

Example 1

Segment type=Areas such as urban, rural, semi-urban
Each training data set comprises cluster of stores that comprises multiple stores of the entity identified by Store_ID that belong to same segment, for example herein, stores from urban zone clustered as first cluster, while stores from rural zone clustered as second cluster.

Example 2

Segment type=Price Zones used for pricing strategy
Each training data set comprises stores of the entity identified by Store_ID that belong to same segment.

The sales driver recorded as columns of the data matrix of the first training data set, for example in FIGS. 3A and 3B, can be columns 2 through 25 comprising Store_ID uniquely identifying store in each segment defined by the entity, Product_ID uniquely identifying the item among the plurality of items in the entity database, demographic data (1 trough n) such as total population, average household income, etc., number of competitors of the entity, Average competitor distance, whether the item (Product) is under promotion (Yes/No), Number of promotions within category, price set by the entity depicted as 'retailer Price' and price set by multiple competitors for the entity depicted as Comp_1_price to Comp_n_price. Further the columns comprise AVs depicted by attribute_1 to attribute_7 and sales share for every item noted as per day per product. The rows of the first training data set correspond to dates depicting when corresponding column data is recorded.

The first ML model 116 can provide the AV level performance values depicting sales share per day of qualitative AVS of the plurality of items of the entity. Machine learning techniques such as support vector machine, random forest are applied to estimate AV level performance values more accurately by removing other sales drivers effect such as demographic, competition, promotion and so on.

An example of the AT enrichment output of first ML model 116 for AVs of table 1 belonging to the qualitative type is as provided in table 2, wherein values of estimate of sales share per day are provided in table 1 below on a scale of 1 to 10.

TABLE 1

| SKU_ID | Brand | Memory (GB) | Color |
|---|---|---|---|
| 1 | X | 2 | White |
| 2 | Y | 4 | Pink |
| 3 | X | 16 | Pink |
| 47 | Z | 4 | Pink |
| 48 | Z | 16 | Pink |
| 49 | Y | 2 | Black |
| 50 | y | 4 | Black |

TABLE 2

| SKU_ID | Brand | Memory (GB) | Color |
|---|---|---|---|
| 1 | 0.3 | 2 | 0.09 |
| 2 | 0.1 | 4 | 0.07 |

TABLE 2-continued

| SKU_ID | Brand | Memory (GB) | Color |
|---|---|---|---|
| 3 | 0.3 | 16 | 0.07 |
| 47 | 0.02 | 4 | 0.07 |
| 48 | 0.02 | 16 | 0.07 |
| 49 | 0.1 | 2 | 0.2 |
| 50 | 0.1 | 4 | 0.2 |

Thus, the AT enrichment considers while recording a plurality of sales drivers for the entity while generating a first training data set for the ML techniques.

An example segment specific AT enrichment is provided in table 3 below:

TABLE 3

| AT = Mobile Brand | | |
|---|---|---|
| | Segment-Urban | Segment-Rural |
| AV1-X | top rank | bottom rank |
| AV2-Y | bottom rank | top rank |

In the example of table 4, ML is run at segment level to estimate sales share/price variation. This value is used to replace AV value. Brand X may have top rank as it might have more sales share estimate in urban, in this way segment level AT enrichment can be performed.

As depicted in FIGS. 3A and 3B, which has inputs used for ML, the last column, which provides the sales share is derived by processing POS system. It is calculated for each store and each day level. The share is derived by considering individual products sales as compared to total sales of all the products within a category. Sales share provides the magnitude of sales that occurs across products within category. When shares of all products are added it comes to 1 or 100%. For notation purpose herein, it is noted as decimal and the sum comes to 1. Thus, when machine learning is running as per the inputs specified in the FIGS. 3A and 3B, the AV level performance is obtained as a decimal value from 0 to 1, based on % share of the product (item). Machine learning algorithms are applied to estimate AV level sales share more accurately by eliminating effect of other sales drivers.

Further, when the item matching is among the plurality of competitor items of the competitor entity then, again at step 204 of the method 200, the data extractor 110 is configured performing the AT enrichment for quantizing the plurality of qualitative AVs of the competitor items based on the ML technique. The AT enrichment for the qualitative AVs of the competitor item comprises determining AV level estimate of price variation per time frame, for the plurality of AVs of the plurality of competitor items corresponding to the qualitative AV type.

The time frame, for example, based on expert observation, can be set to per week, per fortnight or per month, per year.

ML technique comprises training the second ML model 118 to determine the AV level estimate of price variation using a second training data set extracted by crawling data from a plurality of data sources and an entity database. ML techniques such as Support Vector Machine (SVM), random forest are applied to estimate AV level price variations. ML techniques ensure accurate estimate of price variation by removing the effect of competitor's price movements. The data crawled from the plurality of data sources, such as websites of the competitor entity, is analyzed by an item description extractor within the data extractor 110. The item descriptor is configured to extract item description associated with the plurality of competitor products. Further, the item descriptor is configured to extract text from the item description and identify the ATs and AVs of every identified competitor item. The extraction of item description and text analysis can be performed using known natural Language processing (NLP) techniques. Once ATs and AVs are identified, they can be stored in one or other modules of the memory 102.

The second training data set is a two dimensional data matrix constructed for each category among the plurality of categories. A plurality of columns of the data matrix provide information to the second ML model 118 corresponding to the entity, the plurality of competitor entities, and a plurality of ATs of each category and a plurality of rows of the data matrix provide to per hour per day information to the first ML model 116 for which data in the plurality of columns is recorded. FIG. 4 depicts an example second training data set for the second ML model 118, wherein columns provide Product ID, retailer's or entity's set price for the product (item) identified uniquely by product ID, price for the product (item) set by a plurality of competitors through online. Further the columns comprise AVs depicted by Attribute_1 to through Attribute_7 of each of the item uniquely identified by product ID. The second training data set is generated for each price zone among a plurality of price zones defined by the entity.

As there remains a challenge in getting competitor products sales and to derive attribute importance from business standpoint, price movement of products (items) are considered as a signal that indicates the importance of products which lead to importance of attribute that product has. In other words those products with higher price movements provide more signals to indicate the importance of product as compared to those products with lower price movements. However the price movement depends on the other competitor price movement as well. To overcome this issue machine learning is applied using the training data as per table depicted in FIG. 4A and AV level price movement or price variation is estimated through first ML model 116 and the second model 118. It is to be noted that price variation is estimated for major competitor as well as major retailer. Here major competitor refers to the competitor whose items are going to be matched with retailer item. Similarly major retailer indicates the one, whose items are be matched with competitor items. Further, while matching using sales share, both items to be matched have share value for considered for comparison. Similarly, while matching using price variation, both items to be matched have price variation considered for comparison.

It is to be understood that number of AVs considered for example herein limit to 9 and any number of AVs may be present in real time scenarios and output for all of them will be computed by the first ML model 116 and the second ML model 118. Further the first ML model 116 and the second ML model 118 can be refined with regular training as more and more data is recorded and provided as training data arranged in the form of the data matrices mentioned above. Thus the dynamicity of the changing market is well captured at AV level by the method disclosed.

Upon determining, at step 204, the AV level performance values and the AV level estimate of price variations, the plurality of AVs that belong to the qualitative AV type are converted to quantitative. Further, for the plurality of AVs that belong to quantitative type are already having quantitative values. However, the scale of qualitative AV type and quantitative AV type may not necessary be identical, hence standardization is required to bring all the values of the AV level performance estimating sales share per day, the AV level price variations and the values of the plurality of AVs belonging to the quantitative type to a uniform scale, for fair comparison.

Thus, at step 206 of the method 200, the matching item identifier 114 is configured to standardize the AV level performance of the plurality of AVs of the qualitative AV type of the plurality of items and the AV level estimate of price variations of the plurality of competitor items, associated with the category of the item.

Further, the matching item identifier 114 is configured to standardize the plurality of AVs of the quantitative type, corresponding to the plurality of items and plurality of competitor items, associated with the category of the item. The standardization enables bringing all values in the table 2 to a uniform scale for a fair comparison.

Standardization is done in accordance with known standardization or scaling techniques, an example approach is provided below:

Standardization of data points, referring to AV level performance values or the AV level estimate of price variation s obtained from ML models, is done as mentioned below:

$$xstd_{ij}=(x_{ij}-min_i)/(max_i-min_i)$$

where. $xstd_{ij}$—standardized value of jth attribute value of ith attribute $x_{ij}$—value of jth attribute value of ith attribute. The value refers to AV level estimate of sales share or the AV level estimate of price variations
$min_i$—minimum value of ith attribute
$max_i$—maximum value of ith attribute
where 'i' takes the values ranging from 1, 2, 3, . . . m and it denotes attribute
where 'j' takes the values ranging from 1, 2, 3, . . . n and it denotes attribute value In other words, the data points are standardized based on a ratio of (i) a difference of value of jth attribute value of ith attribute and minimum value of ith attribute (ii) a difference of maximum value of ith attribute and minimum value of ith attribute, where 'i' ranges from 1 to m and 'j' ranges from 1 to n, giving standardized data points.

Provided below in table 4 is a sample standardized data for AVs (both quantized qualitative AV type and the quantitative AV type) of table 2.

TABLE 4

| SKU_ID | Brand | Memory (GB) | Color |
| --- | --- | --- | --- |
| 1 | 1 | 0 | 0.15 |
| 2 | 0.28 | 0.14 | 0 |
| 3 | 1 | 1 | 0 |
| 47 | 0 | 0.14 | 0 |
| 48 | 0 | 1 | 0 |
| 49 | 0.28 | 0 | 1 |
| 50 | 0.28 | 0.14 | 1 |

Prior to initiating comparison to identify the matching item set, the standardized values are weighed by assigned weights. Thus, at step 208 of the method 200, the matching item identifier 114 is configured to assign weights to the standardized AV level performance values of the plurality of items and the standardized AV level estimate of price variations of the plurality of competitor items. The value of the weight is based on a Demand Transfer (DT) value of every AV value provided by a Customer Decision Tree (CDT) at the AV level obtained for the category of the item.

The CDT can be obtained as disclosed in a prior filed patent application number application no. 201821024236 filed on 29 Jun. 2018.

The CDT provides order of ATs where top AT has lowest Demand Transfer (DT) value and bottom most attribute has highest DT value, where DT provides percentage shift of demand from one AV1 to another AV2.

If there are m attributes and if they are sorted as 1 to m where m is the lowest important attribute, the AV level weights can be derived using the below steps Formula for top attribute $wt_1=(1-DT_1)*10^{\wedge}(m-1)$ Formula for the next attribute $wt_2=(1-DT_2)*10^{\wedge}(m-2)$ Formula for the nth attribute $wt_m=(1-DT_m)*10^{\wedge}(m-m)$ $DT_1, DT_2, DT_3, \ldots DT_m$ are the demand transfer value of first, second . . . m th attribute after sorting ascendingly. These formula ensures better differentiation between attribute weights.

$xwt_{ij}=xstd_{ij}*wt_i$ where $xwt_{ij}$—weightage associated value of jth attribute value (AV) of ith attribute $xstd_{ij}$—standardized value of jth attribute value (AV) of ith attribute $wt_i$—Weightage of the ith attribute Once weights are determined to provide weighted values of AV level performance for the plurality of items and weighted values of AV level estimate of price variations for the plurality of competitor items, at step 210 of the method 200, the matching item identifier 114 is configured to identify a matching item set for the item based on a matching score computed using a multivariate distance metrics. The matching item set comprises a plurality of members arranged in ascending order of the matching. The matching item set is identified by comparing the weighted AV level performance values of the item and the plurality of items, if the item is to be matched with the plurality of items associated with the entity.

The multivariate distance metrics, for example can be Euclidean distance, Mahalanobis distance, and the like. Sorting of items based on the multivariate distance indicate the quantified form of similarity, wherein less the distance greater is the matching score.

In case of partial matching, two products have few common AVs. For example, if we consider three mobiles such as (a) Brand X_16 GB_black, (b) Brand X_4 GB_white and (c) Brand X_2 GB_pink mobile, they are having brand X as common AV for Brand (AT) and AVs of memory and color are not matching. The three pairs such as (i) mobile a and b, (ii) mobile b and c, and (iii) mobile a and c have partial matching.

Existing techniques, consider the above products (items) as having similarity or closeness between mobiles within each pair listed above. In other words, the matching distance between mobile 'a and b' is same as the distance between b and c. However as per method disclosed herein, mobiles 'a and b' are more closer as compared to a and c. The reason is that the method disclosed considers magnitude of memory size and also sales share estimate of color. For explanation purpose, it is assumed that the order of sales share estimate as black, white followed by pink that is provided by the first ML model 116. In addition, the method disclosed also considers user mindset while performing matching, such as memory size is of more interest to the user as compared to color. This user mindset is captured by ML by reflecting in sales share per day. Thus, memory (AT) carries more weightage as compared to color (AT). In similar fashion it applies for those products which have no matching in any of the attributes. Some example use cases that are enabled through item matching are provided below:

Consumer shopping: Consumers can quickly compare product prices across stores and go for the best deal on offer.

Offers intelligence: Retailers can get insights on how the products they sell are priced compared to their competitors.

Assortment intelligence: Retailers can identify assortment gaps by comparing their assortment with that of their competitors.

Catalog enrichment: Retailers can enrich their existing product catalog with aggregated product data from different stores.

Product analytics: Brands, retailers, and ecommerce companies can get aggregated product ratings and price trends from across the web. This is very useful for them to see how their product is performing at different stores.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for item matching, the method comprising:

selecting, by a processor, an item of interest among a plurality of items associated with an entity for identifying a matching item set comprising partial matching items and non-matching items from one of the plurality of items of the entity or a plurality of competitor items of a competitor entity among a plurality of competitor entities having a category identical to the category of the item, wherein each item from the plurality of items of the entity and the plurality of competitor items is defined by a set of Attribute Value (AVs), wherein each AV among the set of AVs correspond to one of a qualitative AV type and a quantitative AV type;

performing, by the processor, attribute (AT) enrichment for quantizing a plurality of AVs corresponding to the qualitative AV type based on a Machine Learning (ML) technique, wherein the AT enrichment comprises:

(i) determining AV level performance, depicting estimate of sales share per day, for the plurality of AVs of the plurality of items of the entity, corresponding to the qualitative AV type, if the matching item set is to be identified from the plurality of items of the entity; and (ii) determining AV level estimate of price variation per time frame, for the plurality of AVs of the plurality of competitor items corresponding to the qualitative AV type, if the matching item set is to be identified from the plurality of competitor items of the competitor entity, wherein the ML technique comprises training a first ML model to determine the AV level performance using a first training data set extracted from an entity database, wherein the first training data set is a two dimensional data matrix constructed for each category among the plurality of categories, wherein a plurality of columns of the data matrix provide information to the first ML model corresponding to a plurality of sales drivers recorded for the entity and a plurality of rows of the data matrix provide information to the first ML model corresponding to a day for which corresponding sales drivers are recorded, wherein the ML technique comprises training a second ML model to determine the AV level estimate of price variation using a second training data set extracted by crawling data from a plurality of data sources and the entity database, wherein the second training data set is a two dimensional data matrix constructed for each category among the plurality of categories, and wherein a plurality of columns of the data matrix provide information to the second ML model corresponding to the entity, the plurality of competitor entities, and a plurality of ATs of each category and a plurality of rows of the data matrix provide per hour per day information to the second ML model for which data in the plurality of columns is recorded;

standardizing, by the processor, values of:

the AV level performance of the plurality of AVs of the qualitative AV type of the plurality of items of the entity and the AV level estimate of price variations of the plurality of competitor items, associated with the category of the item; and the plurality of AVs of the quantitative type, corresponding to the plurality of items of the entity and plurality of competitor items, associated with the category of the item;

assigning weights, by the processor, to the standardized values, wherein weight is based on Demand Transfer (DT) value provided by a Customer Decision Tree (CDT) obtained for the category of the item, wherein the DT value captures user mindset by capturing percentage shift of demand from one AV to another AV; and identifying, by the processor, the matching item set based on a matching score computed by comparing the weighted standardized values of the plurality of AVs of the item with one of:

the weighted standardized values of the plurality of AVs of the plurality of items of the entity, if the matching item set is to be identified from the plurality of items of the entity, wherein the matching item set, arranged in descending order of the matching score, comprises the partial matching items and the non-matching items from the plurality of items of the entity being compared; and the weighted standardized values of the plurality of AVs of the plurality of competitor items, if the matching item set is to be identified from the plurality of competitor items of the competitor entity, wherein the matching item set, arranged in descending order of the matching score, comprises the partial matching items and the non-matching items from the plurality of competitor items of the competitor entity being compared.

2. The method of claim 1, wherein the first training data set is generated for each segment among a plurality of segments of every segment type among a plurality of segment types defined by the entity.

3. The method of claim 1, wherein the second training data set is generated for each price zone among a plurality of price zones of every segment type among a plurality of segment types defined by the entity.

4. A system for item matching, the system comprising:
a memory storing instructions;
one or more Input/Output (I/O) interfaces;
and one or more processors coupled to the memory via the one or more I/O interfaces, wherein the one or more processors are configured by the instructions to:
select an item of interest among a plurality of items associated with an entity for identifying a matching item set comprising partial matching items and non-matching items from one of the plurality of items of the entity or a plurality of competitor items of a competitor entity among a plurality of competitor entities having a category identical to category of the item, wherein each item from the plurality of items of the entity and the plurality of competitor items is defined by a set of Attribute Value (AVs), wherein each AV among the set of AVs correspond to one of a qualitative AV type and a quantitative AV type;
perform attribute (AT) enrichment for quantizing a plurality of AVs corresponding to the qualitative AV type based on a Machine Learning (ML) technique, wherein the AT enrichment comprises:
(i) determining AV level performance, depicting estimate of sales share per day, for the plurality of AVs of the plurality of items of the entity, corresponding to the qualitative AV type, if the matching item set is to be identified from the plurality of items of the entity; and
(ii) determining AV level estimate of price variation per time frame, for the plurality of AVs of the plurality of competitor items corresponding to the qualitative AV type, if the matching item set is to be identified from the plurality of competitor items of the competitor entity,
wherein the ML technique comprises training a first ML model to determine the AV level performance using a first training data set extracted from an entity database, wherein the first training data set is a two dimensional data matrix constructed for each category among the plurality of categories, wherein a plurality of columns of the data matrix provide information to the first ML model corresponding to a plurality of sales drivers recorded for the entity and a plurality of rows of the data matrix provide information to the first ML model corresponding to a day for which corresponding sales drivers are recorded,
wherein the ML technique comprises training a second ML model to determine the AV level estimate of price variation using a second training data set extracted by crawling data from a plurality of data sources and the entity database, wherein the second training data set is a two dimensional data matrix constructed for each category among the plurality of categories, and wherein a plurality of columns of the data matrix provide information to the second ML model corresponding to the entity, the plurality of competitor entities, and a plurality of ATs of each category and a plurality of rows of the data matrix provide per hour per day information to the second ML model for which data in the plurality of columns is recorded;
standardize values of:
the AV level performance of the plurality of AVs of the qualitative AV type of the plurality of items of the entity and the AV level estimate of price variation s of the plurality of competitor items, associated with the category of the item; and
the plurality of AVs of the quantitative type, corresponding to the plurality of items of the entity and plurality of competitor items, associated with the category of the item;
assign weights to the standardized values, wherein weight is based on Demand Transfer (DT) value provided by a Customer Decision Tree (CDT) obtained for the category of the item, wherein the DT value captures user mindset by capturing percentage shift of demand from one AV to another AV; and
identify the matching item set based on a matching score computed by comparing the weighted standardized values of the plurality of AVs of the item with one of:
the weighted standardized values of the plurality of AVs of the plurality of items of the entity, if the matching item set is to be identified from the plurality of items of the entity, wherein the matching item set, arranged in descending order of the matching score, comprises the partial matching items and the non-matching items from the plurality of items of the entity being compared; and
the weighted standardized values of the plurality of AVs of the plurality of competitor items, if the matching item set is to be identified from the plurality of competitor items of the competitor entity, wherein the matching item set, arranged in descending order of the matching score, comprises the partial matching items and the non-matching items from the plurality of competitor items of the competitor entity being compared.

5. The system of claim 4, wherein the one or more processors are configured to generate the first training data for each segment among a plurality of segments of every segment type among a plurality of segment types defined by the entity.

6. The system of claim 4, wherein the one or more processors are configured to generate the second training data set for each price zone among a plurality of price zones of every segment type among a plurality of segment types defined by the entity.

7. One or more non-transitory machine readable information storage mediums comprising one or more instructions which when executed by one or more hardware processors causes a method for:
selecting an item of interest among a plurality of items associated with an entity for identifying a matching item set comprising partial matching items and non-matching items from one of the plurality of items of the entity or a plurality of competitor items of a competitor entity among a plurality of competitor entities having a category identical to the category of the item, wherein each item from the plurality of items of the entity and the plurality of competitor items is defined by a set of Attribute Value (AVs), wherein each AV among the set of AVs correspond to one of a qualitative AV type and a quantitative AV type;

performing attribute (AT) enrichment for quantizing a plurality of AVs corresponding to the qualitative AV type based on a Machine Learning (ML) technique, wherein the AT enrichment comprises:

(i) determining AV level performance, depicting estimate of sales share per day, for the plurality of AVs of the plurality of items of the entity, corresponding to the qualitative AV type, if the matching item set is to be identified from the plurality of items of the entity; and (ii) determining AV level estimate of price variation per time frame, for the plurality of AVs of the plurality of competitor items corresponding to the qualitative AV type, if the matching item set is to be identified from the plurality of competitor items of the competitor entity, wherein the ML technique comprises training a first ML model to determine the AV level performance using a first training data set extracted from an entity database, wherein the first training data set is a two dimensional data matrix constructed for each category among the plurality of categories, wherein a plurality of columns of the data matrix provide information to the first ML model corresponding to a plurality of sales drivers recorded for the entity and a plurality of rows of the data matrix provide information to the first ML model corresponding to a day for which corresponding sales drivers are recorded, wherein the ML technique comprises training a second ML model to determine the AV level estimate of price variation using a second training data set extracted by crawling data from a plurality of data sources and the entity database, wherein the second training data set is a two dimensional data matrix constructed for each category among the plurality of categories, and wherein a plurality of columns of the data matrix provide information to the second ML model corresponding to the entity, the plurality of competitor entities, and a plurality of ATs of each category and a plurality of rows of the data matrix provide per hour per day information to the second ML model for which data in the plurality of columns is recorded;

standardizing values of:
the AV level performance of the plurality of AVs of the qualitative AV type of the plurality of items of the entity and the AV level estimate of price variations of the plurality of competitor items, associated with the category of the item; and the plurality of AVs of the quantitative type, corresponding to the plurality of items of the entity and plurality of competitor items, associated with the category of the item;

assigning weights to the standardized values, wherein weight is based on Demand Transfer (DT) value provided by a Customer Decision Tree (CDT) obtained for the category of the item, wherein the DT value captures user mindset by capturing percentage shift of demand from one AV to another AV; and identifying the matching item set based on a matching score computed by comparing the weighted standardized values of the plurality of AVs of the item with one of:

the weighted standardized values of the plurality of AVs of the plurality of items of the entity, if the matching item set is to be identified from the plurality of items of the entity, wherein the matching item set, arranged in descending order of the matching score, comprises the partial matching items and the non-matching items from the plurality of items of the entity being compared; and the weighted standardized values of the plurality of AVs of the plurality of competitor items, if the matching item set is to be identified from the plurality of competitor items of the competitor entity, wherein the matching item set, arranged in descending order of the matching score, comprises the partial matching items and the non-matching items from the plurality of competitor items of the competitor entity being compared.

* * * * *